3,357,865
DRY CELLS

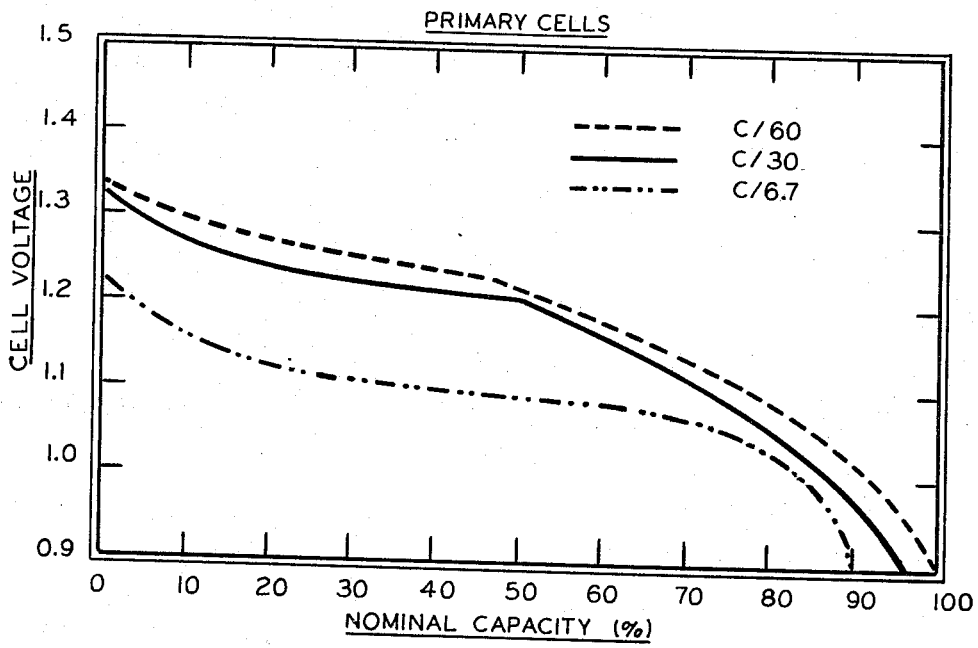
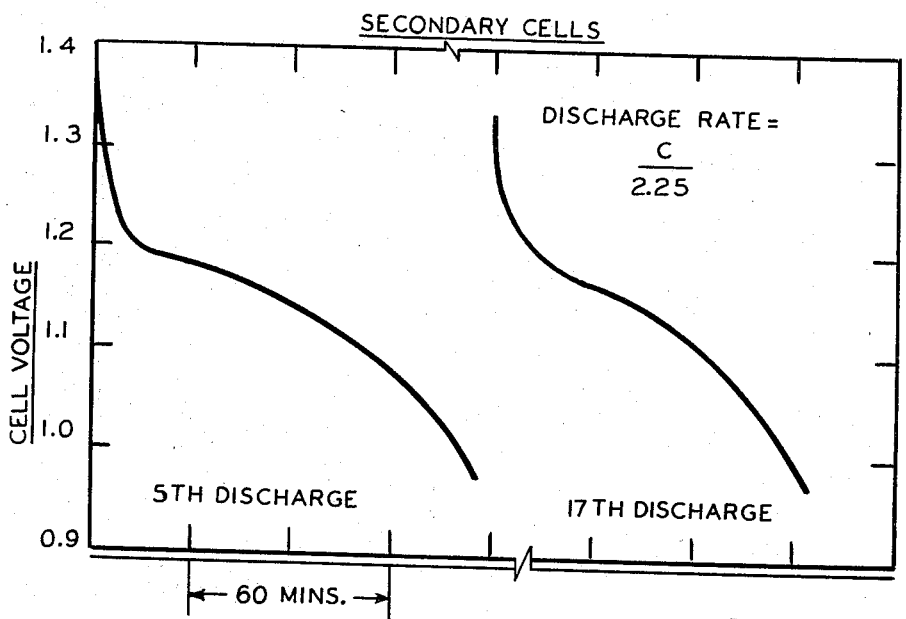

Stanley M. Davis and Charlotte M. Kraebel, Somerville, and Richard A. Parent, Piscataway, N.J., assignors to American Cyanamid Company, Stamford, Conn., a corporation of Maine
Filed Feb. 23, 1966, Ser. No. 529,475
6 Claims. (Cl. 136—137)

This invention generally relates to improved electric cell compositions and to the cells which contain them and, more particularly, it relates to improved cathodic compositions for both primary and secondary battery cells containing substituted azodicarbonamides as the organic components and the improved cells resulting from their use, and to certain such azodicarbonamides which are new compounds.

Electric batteries or cells are devices that convert chemical energy into electrical energy, and include primary and secondary cells. Primary cells are electrochemical devices which convert chemical energy directly to electrical energy by an electrochemical process. Generally, the term "primary cell" refers to the type of cell that is discarded after the chemical energy is converted to electrical energy; that is to say, the chemical reactions involved are not reversible in a practical sense. Primary cells which are manufactured in such a way that no large excess of liquid electrolyte is required are referred to as dry cells. So-called "secondary cells" utilize easily reversible chemical reactions and therefore are rechargeable and can be used repeatedly.

Both primary and secondary cells are made up of a negative electrode called the anode, usually made of a metal such as zinc, magnesium, aluminum, cadmium, etc., and certain alloys in which at least one of these metals constitutes a majority of the composition, and the positive electrode called the cathode. The cathode consists of a conductive material such as carbon, a depolarizer which may be an inorganic or organic oxidant, and an electrolyte. Ionic contact between cathode and anode is necessary, but electronic contact must be avoided if the cell is to be of value to produce electrical energy. In some cells electronic contact is avoided by the nature of the materials involved, i.e., highly insoluble, while in other cells suitable separators are employed.

The individual cells of most batteries in common use deliver 1.0 to 1.6 volts. When greater voltages are required, appropriate combinations of individual cells are employed. It is desirable, as a general rule, that batteries for efficient use deliver the desired voltage at a fairly constant level for a long period of time and have a high ampere-hour capacity. It is also desirable that the batteries be inexpensive, the materials of their manufacture be available, and that they have a reasonable size and weight relative to the power contained therein, i.e., the electrical energy obtainable therefrom. It is also important that the battery have a relatively high and flat operating voltage curve over a wide range of current drains.

The most common and least expensive primary battery, known as the Leclanché cell, conventionally employs manganese dioxide as the depolarizer in combination with a zinc anode and a zinc chloride-ammonium chloride electrolyte solution. This battery is inefficient as a secondary cell and has the deficiency of rapid polarization. An improvement in these characteristics is obtained with a zinc-mercuric oxide cell, but such a cell is much more expensive and too heavy for certain uses. Mercury is often in short supply.

A large number of substitutes for manganese dioxide as depolarizer in the Leclanché cell have been employed or proposed for use. Among the suggested substitutes are many organic compounds which are reducible and have high oxidizing potentials. Such compounds include nitro and nitroso compounds and nitrols among others. In general, all of these show some improvements over manganese dioxide in cell characteristics, but these compounds possess other deficiencies as primary or secondary cell components. These deficiencies include poor shelf-life, self-discharge, inadequate voltage, inefficient rechargeability, inability to be recharged efficiently after discharge beyond relatively high cut-off points, and the like. Thus, there has been a continuing need for improved depolarizers for both primary and secondary cells that result in improved battery characteristics while at the same time avoiding the aforementioned deficiencies.

It is an object of this invention to provide both primary and secondary cells which have a relatively high, flat operating voltage level over a wide range of current drainage.

It is another object of the invention to provide improved electrolyte solutions for use in both primary and secondary cells.

It is another object of the invention to provide improvements in batteries whereby they have increased efficiency and longer shelf-life over batteries now known.

Other and further objects of the invention will become apparent from the description and examples presented hereinbelow.

This invention is based on the discovery that compounds of the substituted azodicarbonamide type, when used as depolarizers in cells, produce batteries of excellent discharge characteristics, while overcoming many of the deficiencies of conventional cell depolarizers. These depolarizers are substituted azodicarbonamides of the formula

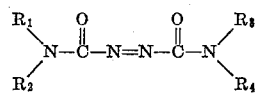

where $R_1$, $R_2$, $R_3$, and $R_4$ may be hydrogen, alkyl of 1 to 8 carbon atoms, mono- and dicarbocyclic aryl or substituted aryl, cycloalkyl, aralkyl, alkoxyalkyl, cyanoalkyl, haloalkyl, nitroalkyl, alkenyl, and where $R_1$ and $R_2$ and/or $R_3$ and $R_4$, when alkyl, may be joined together through a nitrogen, sulfur, or oxygen linkage to form a heterocyclic ring, and not more than three of $R_1$, $R_2$, $R_3$, and $R_4$ are hydrogen.

Thus, it has been found possible, for the purposes of this invention, to use the substituted azodicarbonamides [azobis(formamides)] as depolarizers in batteries, whether the organic compounds are substituted symmetrically, unsymmetrically, or contain a heterocylic ring. The structures which are preferred are those wherein each of the two nitrogen atoms carries as the only substituent an alkyl radical of 3 to 4 carbon atoms. Symmetrical compounds are often more economically available, but symmetry is not essential.

It is not intended in any way to limit this invention to any theory as to the how or why the substituted azodicarbonamides are so effective as depolarizers in both primary and secondary cells, when used in the cathodic compositions. However, the discovery of effectiveness is surprising in that these substituted compounds not only have essentially the same electrochemical properties as the parent unsubstituted compound, azodicarbonamide, but additionally have greatly improved resistance to hydrolytic action of the electrolyte. It is also highly surprising that the improvement in hydrolytic stability should be independent of the solubility of the substituted compound relative to azodicarbonamide in the electrolyte solution. Thus, it has been found that the substituted compounds of greater, as well as of lesser, solubility than azodicarbonamide in the electrolyte solution possess improved hydrolytic stability over the parent compound and provide cells of greatly improved shelf-life.

The compounds of the present invention, when employed as depolarizers in cells, in addition to providing such cells with increased shelf-life also offer additional advantages. These additional advantages include flatter discharge curves at various drain rates, rechargeability, extended useful life over multiple discharge-charge cycles, recoverability from relatively deep discharges, limited adverse effects due to over-charging, little or no loss of chemicals through side reactions, negligible gassing, use of inexpensive materials, and favorable size and weight ratio to power available. Thus, the compounds of the present invention as depolarizers in both primary and secondary cells provide batteries that have improved efficiency and extended life.

Among the specific compounds having the general structure given above which are useful as depolarizers in the present invention are included the following substituted azodicarbonamides:

1,1'-azobis(N-methylformamide)
1,1'-azobis(N,N-dimethylformamide)
1,1'-azobis(N-ethylformamide)
1,1'-azobis(N-n-propylformamide)
1,1'-azobis(N-isopropylformamide)
1,1'-azobis(N-n-butylformamide)
1,1'-azobis(N-isobutylformamide)
1,1'-azobis(N-sec.-butylformamide)
1,1'-azobis(N-tert.-butylformamide)
1,1'-azobis(N-octylformamide)
1,1'-azobis(N,N-pentamethyleneformamide)
1,1'-azobis(N,N-oxydiethyleneformamide)
1,1'-azobis(N,N-tetramethyleneformamide)
1,1'-azobis(N,N-iminodiethyleneformamide)
1,1'-azobis(N-phenylformamide)
1,1'-azobis[N-(3-chlorophenyl)formamide]
1,1'-azobis(N-p-tolylformamide)
1,1'-azobis(N-p-xylylformamide)
1,1'-azobis(N-2-naphthylformamide)
1,1'-azobis[N-(2-chlorophenyl)formamide]
1,1'-azobis[N-(4-methoxyphenyl)formamide]
1,1'-azobis[N-(3-nitrophenyl)formamide]
1,1'-azobis[N-(4-dimethylaminophenyl)formamide]
1,1'-azobis(N,N-diisopropylformamide)
1,1'-azobis(N,N-dibutylformamide)
N-methyl-N'-ethyl-1,1'-azobisformamide
N-methyl-N'-hexyl-1,1'-azobisformamide
N-methyl-N',N'-tetramethylene-1,1'-azobisformamide
N-methyl-N',N'-oxydiethylene-1,1'-azobisformamide
1,1'-azobis(N-2-cyanoethylformamide)
1,1'-azobis(N-3-methoxypropylformamide)
1,1'-azobis(N-4-chlorobutylformamide)
1,1'-azobis(N-allylformamide)
N-ethyl-N'-p-methoxyphenyl-1,1'-azobisformamide
N-n-propyl-N'-n-amyl-1,1'-azobisformamide
N-methyl-N'-phenyl-1,1'-azobisformamide
N-methyl-N'-n-butyl-1,1'-azobisformamide
N-methyl-N'-p-ethylphenyl-1,1'-azobisformamide
N-methyl-N'-1-naphthyl-1,1'-azobisformamide
N-ethyl-N'-n-propyl-1,1'-azobisformamide
N-ethyl-N'-n-hexyl-1,1'-azobisformamide Mixtures of these azodicarbonamides may be used in cells, as well as the compounds individually.

By adding an oxide such as zinc oxide, barium oxide or magnesium oxide, to react with acid which may be formed, the substituted azodicarbonamides of this invention may be formed in situ in the cell by adding the corresponding substituted biurea, and oxidizing by charging the cell. The reaction is comparable to that shown for the second equation of Example 2 or 3, with variations based on the substituents chosen within the classes here outlined. A secondary battery, charged at time of first use is storage stable for a long time; although the primary cells containing the substituted azodicarbonamide have excellent shelf-life characteristics. Ready to use items usually meet with better commercial acceptance than do items requiring preparation for use by the consumer. Some users will choose to use cells of this invention as discardable primary cells—others will choose to recharge when voltage drops, or on a fixed schedule.

A higher drain rate is obtainable if the substituted azodicarbonamide is finely divided. Good cells result if the substituted azodicarbonamide is in the particle size range of 20 to 40 microns. Subdividing to about 1 micron permits a higher drain rate. The larger surface area is preferred also for the more insoluble azodicarbonamides. The smaller size is obtainable by grinding, or by crystallizing under conditions which yield smaller crystals.

The compounds are used in the cathodic mix in the range of from 10 to 50% of the total weight of the cathodic mix. The cathodic mix additionally contains electrolyte solution and carbon black in any of its various forms, such as graphite, acetylene black, or high surface area carbon or other known forms of carbon black.

The electrolyte solution itself may be an aqueous solution containing a soluble salt, such as sea water, or water to which one or more soluble salts have been added. Halide salts or mixtures of halide salts containing cations such as ammonium and metals such as zinc, manganous, etc., are preferred soluble salts in the electrolyte. The electrolyte may be prepared by dissolving the salt in water at a concentration of between 30 grams per liter and that producing a saturated solution at ordinary temperatures. The concentration does not appear to be especially critical, although for best results certain concentrations are preferred depending upon the particular salt or combination of salts that are used.

For primary cells of this invention a combination of 170 grams of zinc chloride and 270 grams of ammonium chloride per 1000 grams of solution has been found satisfactory. For secondary cells, a combination of 170 grams of zinc chloride and 270 grams of ammonium bromide per 1000 grams of solution has been found especially useful. It will be noted that the nature of the cell, i.e., primary or secondary, will influence to some extent the choice of salts employed in the electrolyte, with bromide-containing mixtures being preferred in secondary cells. The bromide containing mixtures provide a particularly useful combination with the substituted azodicarbonamides, in secondary cells, in that their use tends to overcome undesirable effects resulting from overcharging.

The anode of the batteries of the present invention is an electropositive metal, usually zinc, magnesium, aluminum, or other metal standing high in the electromotive series, or certain mixtures or alloys thereof, including such additional metals as manganese, zirconium, cerium, calcium, and the like. Zinc in pure or alloyed form is the preferred metal, especially with secondary cells.

The cells are frequently cylindrical, and of standard sizes, to fit electrical equipment. Flat, rectangular, button, or other shape of cells may be made using the present cell compositions. The size and shape are determined by capacity requirements, and space available. Preferably, but not necessarily, the cells will have a conventional size to fit standard size flashlights, radios, recorders, emergency exit lights, etc.

Satisfactory results are obtained using conventional type separators such as kraft paper; kraft paper coated or impregnated with starch or other gel-like material such as carboxymethyl cellulose and/or cereal paste; vegetable parchment and the like. Superior results are achieved if a laminated cellophane separator is used. This separator may be described in somewhat more detail as a laminate of a film of small pore size (such as cellophane with an average pore diameter of 16 A.) with a cellulosic paper of high water retention properties which may have as an adhesive a material such as gum arabic. Other films such as porous nylon, polyester films, polyolefin films, polyacrylate films, polyvinylacetate films, or polyvinylchloride films, and other low porosity films, having pore sizes in the range of 5 to 40 angstrom units are useful. The pores must permit ions to pass readily, and inhibit diffusion of other materials.

Although it is not necessary for producing a useful rechargeable cell, the use of this laminated cellophane type separator results in considerable improvement in the cycling characteristics of the cell. Thus, using a regular porous kraft paper separator (or one which is impregnated with starch or carboxymethyl cellulose or composed of porous nylon, vegetable parchment, etc.), the cells normally give satisfactory performance through at least 10 charge-discharge cycles. Using the cellophane laminate separator, the cell is normally satisfactory through up to 40 or more cycles. Thus, although not actually necessary, the cellophane laminate type separator is definitely preferred for superior performance in these cells.

In the attached drawings:

FIGURE 1 shows the variations of voltage with percent of capacity of the primary cells of Example 4.

FIGURE 2 shows the variations of voltage with time over representative charge cycles of the rechargeable battery of Example 5.

The invention will be further illustrated by the hereinafter presented examples. It is to be understood, however, that these examples are presented as illustrative only and that it is in no way intended to limit the invention thereto.

EXAMPLE 1

*Preparation of 1,1'-azobis(N-methylformamide)*

Reaction:

$$2CH_3NH_2 + C_2H_5OCON=NCOOC_2H_5 \rightarrow$$
$$CH_3NHCON=NCONHCH_3 + 2C_2H_5OH$$

Into a suitably equipped reaction vessel was placed 50 grams (0.275 mol) of diethyl azodicarboxylate and 400 ml. of ethyl ether. 85 ml. of 20% methylamine (0.55 mol) in methanol was added to the reaction vessel slowly with stirring over a period of 30 minutes. The resulting dark orange slurry was stirred for an additional 15 minutes, filtered, and the filter cake washed with ether. The resulting orange solid had a melting point of 176.5–177° C.

By similar procedures, using the indicated starting materials and solvents, the additional compounds listed in Table I were also prepared.

EXAMPLE 2

*Preparation of N-phenyl-1,1'-azobisformamide*

Reaction:

(1) $C_6H_5N=C=O + H_2NNHCONH_2 \rightarrow$
$C_6H_5NHCONHNHCONH_2$ (2) $C_6H_5NHCONHNHCONH_2 + [O] \rightarrow$
$C_6H_5NHCON=NCONH_2 + H_2O$ Into a suitably equipped reaction vessel was placed 2.25 grams (0.03 mol) of semicarbazide and 25 ml. of methanol. While this solution was stirred and cooled, 2.2 ml. (0.02 mol) of phenyl isocyanate was added slowly in dropwise fashion, forming a white precipitate. The reaction mixture was stirred for 30 minutes after addition was complete. The solid product was recovered by filtration, washed with boiling methanol, and allowed to dry in air. The N-phenylbiurea obtained was recrystallized from acetic acid and had a melting point of 234° C. (also named 1-phenylbiurea).

The compound (0.5 gram) obtained from the above reaction was mixed in a reaction vessel with 2 grams of ammonium nitrate, 0.05 gram of cupric acetate monohydrate, and 25 grams of acetic acid. This mixture was heated in a water bath at 70° C. for 5 minutes during which time the color changed from yellow-green to dark green. The mixture was then poured onto ice to give an orange solid which was filtered and dried in air. The N-phenyl-1,1'-azobisformamide was recrystallized from ethanol and yielded a red-orange solid which decomposed at 184° C.

By a similar procedure starting with 22.6 grams of 4-phenyl-semicarbazide in benzene with a trace of pyridine and adding 8.54 grams of methyl isocyanate, N-methyl-N'-phenylbiurea(1-methyl - 6 - phenylbiurea) was obtained as a white solid of decomposition point 239–240° C. This product upon subsequent oxidation as described above yielded N-methyl-N'-phenyl-1,1'-azobisformamide, an orange solid of decomposition point 162–163° C.

EXAMPLE 3

*Preparation of 1,1'-azobis(N-phenylformamide)*

Reaction:

(1) $2C_6H_5N=C=O + N_2H_4 \cdot H_2O \rightarrow$
$C_6H_5NHCONHNCONHC_6H_5 + H_2O$ (2) $C_6H_5NHCONHNHCONHC_6H_5 + [O] \rightarrow$
$C_6H_5NHCON=NCONHC_6H_5 + H_2O$ Into a suitably equipped reaction vessel was placed 15 grams (0.3 mol) of 100% hydrazine hydrate and 200

TABLE I.—PREPARATIONS FROM DIETHYL AZODICARBOXYLATE AND AMINE

| Compound | Amine | Solvent | Melting Point, °C. | Decomposition Point, °C. |
|---|---|---|---|---|
| 1,1'-azobis(N-allylformamide) | Allyl | Methanol plus ether | | 150–151 |
| 1,1'-azobis[N-(2-methoxyethyl) formamide] | 2-methoxyethyl | do | 105–108 | |
| 1,1'-azobis[N-(2-cyanoethyl) formamide] | 2-cyanoethyl | do | | 188–189 |
| 1,1'-azobis(N-methylformamide) | Methyl | Ether | 176.5–177 | |
| 1,1'-azobis(N,N-dimethylformamide) | Dimethyl | Methanol plus ether | | 108–109 |
| 1,1'-azobis(N-ethylformamide) | Ethyl | Ether | | 132–133 |
| 1,1'-azobis(N,N-diethylformamide) | Diethyl | do | | |
| 1,1'-azobis(N-n-propylformamide) | n-Propyl | do | | 156–157 |
| 1,1'-azobis(N-isopropylformamide) | Isopropyl | do | | 169–170 |
| 1,1'-azobis(N-n-butylformamide) | n-Butyl | Methanol plus ether | | 165 |
| 1,1'-azobis(N-isobutylformamide) | Isobutyl | do | | 161 |
| 1,1'-azobis(N-sec.butylformamide) | Sec. butyl | do | | 179–180 |
| 1,1'-azobis(N-ter.butylformamide) | Ter. butyl | None | | 187–190 |
| 1,1'-azobis(N-n-hexylformamide) | n-Hexyl | Ether | | |
| 1,1'-azobis(N-n-octylformamide) | n-Octyl | do | | |
| 1,1'-azobis(N,N-pentamethyleneformamide) | Piperidine | Ligroin | 135–137 | |
| 1,1'-azobis(N,N-oxydiethyleneformamide) | Morpholine | do | | |
| 1,1'-azobis(N,N-tetramethyleneformamide) | Pyrrolidine | Ether | | |
| N-n-butyl-N'-methyl-1,1'-azobisformamide | Methyl n-butyl [1] | do | | 150–152 |
| 1,1'-azobis(N-benzylformamide) | Benzyl | Methanol and ether | | 197–202 |

[1] Equimolar amounts.

70 ml. of benzene. The solution was stirred and cooled in an ice bath while 85 grams (0.7 mol) of phenyl isocyanate dissolved in 200 ml. of benzene was slowly added in dropwise fashion. A white precipitate formed. The mixture was stirred for 2 hours, filtered while cold and the solids were recrystallized from dimethylformamide. The white solid N,N-diphenylbiurea obtained had a melting point of 250° C. (also named 1,6-diphenylbiurea).

The above product (0.5 gram) was oxidized according to the procedure described in Example 2. The color change observed was from blue first to green and then to yellow and orange. The orange needles of 1,1'-azobis(N-phenylformamide) obtained after recrystallization from acetone decomposed at 177° C.

1,1'-azobis[N - (3 - chlorophenyl)formamide] was obtained by a similar procedure starting with 32.2 grams (0.21 mol) of m-chlorophenyl isocyanate and 5.0 grams (0.1 mol) of hydrazine hydrate in a total reaction medium of 150 ml. of benzene. The N,N'-bis(3-chlorophenyl)biurea was characterized as a white product decomposing at 244–245° C. The 1,1'-azobis[N-(3-chlorophenyl)formamide] obtained after oxidation as described above was found to decompose at about 180–200° C.

EXAMPLE 4

Primary cells

Primary cells of construction similar to Leclanche cells except for the cathodic mix were prepared using the following as cathodic mixes:

(A)

| | |
|---|---|
| 1,1'-azobis(N-n-butylformamide) g | 2.40 |
| Carbon black (HR 1670–P6303) (Columbia Carbon Co.) g | 0.64 |
| 17% $ZnCl_2$, 27% $NH_4Cl$, 56% $H_2O$ ml | 2.0 |

(B)

| | |
|---|---|
| 1,1'-azobis(N-isobutylformamide) g | 1.80 |
| Carbon black (SA 40–220) (Columbian Carbon Co.) g | 0.48 |
| 17% $ZnCl_2$, 27% $NH_4Cl$, 56% $H_2O$ ml | 3.0 |

(C)

| | |
|---|---|
| 1,1'-azobis(N-n-butylformamide) g | 2.38 |
| Acetylene black g | 0.64 |
| 17% $ZnCl_2$, 27% $NH_4Cl$, 56% $H_2O$ ml | 2.1 |

(D)

| | |
|---|---|
| 1,1'-azobis(N-n-butylformamide) g | 2.32 |
| Carbon black (HR 1670–P6303) (Columbian Carbon Co.) g | 0.62 |
| 10% $ZnCl_2$, 50% $MnCl_2.4H_2O$, 40% $H_2O$ ml | 1.8 |

(E)

| | |
|---|---|
| 1,1'-azobis(N-n-propylformamide) g | 2.32 |
| Carbon black (SA–40–220) (Columbian Carbon Co.) g | 0.61 |
| 17% $ZnCl_2$, 27% $NH_4Cl$, 56% $H_2O$ ml | 2.2 |

The battery discharge characteristics are shown in FIGURE 1 of the drawings, attached hereto, and are represented as cell voltages as functions of nominal capacity thereof. This method of expression is best understood in view of the following explanation:

The capacity depends on the rate of discharge. The nominal capacity is taken as that capacity obtained when the battery is discharged to its end-point voltage under very low drain conditions. Various discharge rates are shown wherein the battery is discharged to its end-point voltage of 0.9 volt in the number of hours shown in the denominator. Thus, C/60 designates a discharge rate wherein the end-point voltage of 0.9 volt is reached in 60 hours. The C/60 discharge rate in FIGURE 1 was obtained with a 150 ohm load.

The curves shown in FIGURE 1 represent typical curves obtained with the substituted azodicarbonamides of the present invention when used in the cathodic mixes of primary cells as described above. It is apparent that flat discharge rates are obtained throughout most of the cell life at varying rates of discharge. This behavior illustrates the highly desirable depolarizer characteristics which the substituted azodicarbonamides possess when used in primary cells.

EXAMPLE 5.—SECONDARY CELLS

Cathodic mix 0.50 g. 1,1'-azobis(N-n-propylformamide)
0.50 g. carbon black (SA 40–220) (Columbian Carbon Co.)
2.0 ml. 17% $ZnCl_2$, 27% $NH_4Br$, 56% $H_2O$

Cell construction

A glass cylinder was enclosed at one end with carboxymethyl cellulose coated kraft paper to which a strip of α-cellulose was attached. On the outside of the α-cellulose was placed a strip of pure zinc metal. The cathode mix was placed in the enclosed glass cylinder and a weighted carbon rod was inserted as a contact to the cathode mix. The cylinder was then stoppered at the top. The completed cell was dipped in the electrolyte for 15–30 seconds and then placed in an atmosphere saturated with electrolyte vapor. The cell was continuously discharged through a 24-ohm resistor to 0.985 v. and then charged to 1.535 v. This cycle was repeated as shown in the curves of FIGURE 2. These curves show the good characteristics of the organic compound as a depolarizer. After its 17th discharge cycle, the secondary cell is shown to have good characteristics comparable to its initial characteristics.

EXAMPLE 6

The solubility of various substituted azodicarbonamides in electrolyte solutions was determined by preparing a saturated solution, removing excess compound by filtration, and assaying by iodometric titration the amount dissolved. The solubilities determined are given in Table II. The stability of the various substituted azodicarbonamides was determined by placing a given amount of the compound in the electrolyte, stirring for one hour at 100° C., and then determining the amount of compound remaining by iodometric titration. These results are also given in Table II.

The shelf-life of cells containing cathodic mixes having azodicarbonamides as the depolarizers therein was determined by preparing normal dry cell cathodic mixtures and storing for 30 days at 45° C. Analyses to determine the amount of depolarizer remaining were then made. Results are also given in Table II.

The results of one hour stability tests at 100° C. indicate that the various substituted azodicarbonamides are virtually unaffected by such storage conditions (95–100% of compound remains) while the parent compound, azodicarbonamide, is essentially completely hydrolyzed. The stability of the substituted azodicarbonamides is independent of their solubility in the electrolyte relative to that of azodicarbonamide itself, i.e., compounds both more and less soluble than the parent compound are more stable.

Shelf-life data, as determined by the experiments of this example, indicate the improvements obtained by use of the compounds of this invention for cell depolarizers.

TABLE II.—SOLUBILITY AND STABILITY OF VARIOUS AZODICARBONAMIDES IN CONTACT WITH ELECTROLYTE

| Compound | Solubility [1] | Stability [2] | Shelf-life [3] |
|---|---|---|---|
| Azodicarbonamide | 85 | 2.0 | 35–40 |
| 1,1'-azobis(N,N-dimethylformamide) | 191,000 | 97.0 | |
| 1,1'-azobis(N-ethylformamide) | 9,100 | 95.0 | |
| 1,1'-azobis(N-n-propylformamide) | 330 | 99.5 | 88 |
| 1,1'-azobis(N-isopropylformamide) | 1,360 | 98.5 | |
| 1,1'-azobis(N-n-butylformamide) | 10 | 99.5 | 90 |
| 1,1'-azobis(N-isobutylformamide) | 13 | 99.0 | |
| 1,1'-azobis(N-sec.butylformamide) | 136 | 99.1 | |
| 1,1'-azobis(N-ter.-butylformamide) | 155 | 99.5 | 90 |
| 1,1'-azobis(N-phenylformamide) | 10 | 100.0 | |
| 1,1'-azobis(N,N-pentamethyleneformamide) | 730 | 99.5 | |
| N-phenyl-1,1'-azobisformamide | | 53.0 | |
| N-butyl-N'-methyl-1,1'-azobisformamide | 460 | | |
| 1,1'-azobis(N-allylformamide) | 1,700 | | |
| 1,1'-azobis[N-(2-methoxyethyl)formamide] | 40,500 | | |

[1] Milligrams per liter of electrolyte solution, 17% ZnCl$_2$, 27% NH$_4$Cl, 56% H$_2$O, at 25° C.
[2] Percent compound remaining after 1 hour at 100° C. in presence of electrolyte.
[3] Percent compound remaining after 30 days at 45° C. in a dry cell construction.

EXAMPLE 7

An "AA" size cell was prepared using a zinc can, a cellophane laminate as separator, and a cathodic mix containing:

2.0 grams 1,1'-azobis(N-n-propylformamide)
0.67 gram carbon black (1300 sq. meters per gram)
2.3 ml. 17% ZnCl$_2$, 27% NH$_4$Br, 0.3% HgCl$_2$, 55.7% H$_2$O This cell was cycled more than sixty times before shorting out. A cycle consisted of a 4.0 hour discharge through a 25 ohm load followed by a 4.5 to 5.0 hour charge at 40 milliamperes.

Dry cells prepared from each of the other 1,1'-azodicarbonamides listed in Table I and Table II gave comparably good results. The capacity is, of course, proportional to that expected from the molecular weight of the compounds, the larger molecular weight compounds having less capacity per gram of depolarizer.

EXAMPLE 8

An "AA" cell was prepared as Example 7 except for the cathodic mix which had the following composition:

2.25 grams 1,1'-azobis(N-n-butylformamide)
0.67 gram carbon black (1300 sq. meters per gram)
2.0 ml. 17% ZnCl$_2$, 27% NH$_4$Br, 56% H$_2$O.

This cell was cycled more than thirty times before shorting out. A cycle consisted of discharge through a 24-ohm resistor to 1.00 v. followed by a tapered charge to 1.50 v.

EXAMPLE 9

An "AA" size cell was prepared using a zinc can, a cellophane laminate having a pore size of around 16 angstroms, and a cathodic mix containing:

1.5 grams N-n-butyl-N'-methylbiurea
1 gram of carbon black, surface area 1300 sq. meters per gram
0.66 gram of zinc oxide
3.5 ml. electrolyte containing: 35% ZnCl$_2$, 20% NH$_4$Cl, 0.3% HgCl$_2$, 44.7% H$_2$O The zinc can was lined with the laminate as a separator with the laminate extending about ¼-inch above the can. The above cathodic mix was tamped into the cell. A carbon rod having a brass cap was inserted into the mix. The laminate was folded over the top of the cathodic mix and the cell sealed with epoxy resin.

The cell was charged for 16 hours at 20 milliamperes; then discharged through a 20-ohm resistor until the voltage drops to 0.96 volt. The cell was then charged at 20 milliamperes until the voltage reached 1.65. The cell performed satisfactorily for 4 cycles, at which time the test was discontinued.

The substituted biurea was used as a starting material with N-n-butyl-N-methyl-1,1'-azobisformamide being synthesized in the cell, by the use of the charging current. Corresponding biureas may be used as a source for other substituent azobisformamides, with the cells being charged to produce the azobisformamides either at the time of manufacture, or other convenient time prior to use.

As the substituted azobisformamide is stabilized over a long period of time, in these cells it is usually more convenient to preform the substituted azobisformamide and add as a component of the cathodic mix, rather than synthesize in situ.

We claim:
1. In a cell comprising in combination an anode of a highly electropositive metal and a cathode composition comprising a mixture of carbon, a depolarizer compound and an electrolyte, the improvement wherein the depolarizer compound has the formula:

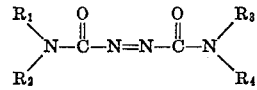

in which R$_1$, R$_2$, R$_3$ and R$_4$ are selected from the group consisting of hydrogen, alkyl of 1 to 8 carbon atoms, mono- and dicarbocyclic aryl, and substituted aryl, cycloalkyl, aralkyl, alkoxyalkyl, cyanoalkyl, haloalkyl, nitroalkyl, alkenyl, R$_1$ and R$_2$ and/or R$_3$ and R$_4$, when alkyl may be joined directly or through a nitrogen, sulfur or oxygen atom to form a heterocyclic ring, and not more than three of R$_1$, R$_2$, R$_3$, and R$_4$ are hydrogen.

2. The cell of claim 1, in which the anode is zinc.
3. The cell of claim 1, in which the cathode composition contains a bromide salt in the electrolyte.
4. The cell of claim 1, in which in the depolarizer compound R$_1$ and R$_3$ are hydrogen.
5. The cell of claim 4, in which, in the depolarizer compound R$_2$ and R$_4$ are propyl.
6. The cell of claim 4, in which in the depolarizer compound R$_2$ and R$_4$ are butyl.

References Cited

UNITED STATES PATENTS 2,836,644  5/1958  Morehouse et al. _____ 136—137

WINSTON A. DOUGLAS, *Primary Examiner.*
D. L. WALTON, *Assistant Examiner.*